United States Patent [19]

Goyins et al.

[11] Patent Number: 5,461,703
[45] Date of Patent: Oct. 24, 1995

[54] PIXEL IMAGE EDGE ENHANCEMENT METHOD AND SYSTEM

[75] Inventors: Gregg Goyins; Dellas Frederiksen, both of Boise; Jeff H. Papke, Meridian, all of Id.

[73] Assignee: Hewlett-Packard Company, Palo Alto, Calif.

[21] Appl. No.: 960,758

[22] Filed: Oct. 13, 1992

[51] Int. Cl.$^6$ .................................................. G06K 15/00
[52] U.S. Cl. ........................ 395/109; 395/129; 395/131; 345/136; 382/173
[58] Field of Search ................................... 395/106, 129, 395/109, 110, 151, 122, 126, 104, 121, 123, 129, 131, 143, 164; 382/21, 54, 55, 41, 44; 345/136, 137, 141–144

[56] References Cited

U.S. PATENT DOCUMENTS

| | | | |
|---|---|---|---|
| 4,815,009 | 3/1989 | Blatin | 395/129 |
| 4,887,228 | 12/1989 | Robert | 395/129 |
| 4,897,805 | 1/1990 | Wang | 395/129 |
| 5,123,085 | 6/1992 | Wells et al. | 395/121 |
| 5,276,783 | 1/1994 | Fossum | 395/123 |

FOREIGN PATENT DOCUMENTS 356262  2/1990  European Pat. Off. ......... G06F 15/72

OTHER PUBLICATIONS

Graphics Area Fill with Point Classification, IBM Technical Disclosure Bulletin, vol. 27, No. 11, Apr. 1985, pp. 6398–6400.
"The Edge Flag Algorithm—A Fill Method For Raster Scan Displays", Ackland et al; IEEE Transactions on Computers, vol. C–30, No. 1, Jan. 1981, pp. 41–47.
"Efficient Polygon–Filling Algorithms For Raster Displays", Dunlavey, ACM Transactions on Graphics, vol. 2, No. 4, Oct. 1983, pp. 264–273.
"Digitized Brush Trajectories", Hobby, Report No. STAN–CS–85–1070, Dept. Of Computer Science, Stanford University (1985).
"Rendering Fat Lines on a Raster Grid", by Wallace, "Graphics Gems", Glassner, Editor, Academic Press, Inc. San Diego, Calif. 92101 (1990), pp. 114–120.

*Primary Examiner*—Mark R. Powell
*Assistant Examiner*—Tracy M. Legree

[57] ABSTRACT

A data processing system that prints characters using a raster-scan pixel representation employs an inversion technique to achieve the filling of interior pixels within a polygon. At intersections of segments that define edges of the polygon, a common pixel may be shared by the last pixel of a first line segment and a first pixel of a second line segment. The inversion action is inhibited when considering the last pixel of the aforesaid first segment and is turned on for the first pixel of the next segment. In this manner, double inversions that cause fill splinters are avoided. The data processing system also employs a method for rendering vectors with pen widths of varying magnitude where, based upon the angle of inclination of the vector, its end points are derived. The end points are then modified by addition of integer offset values to take into account differences between given pen widths and pixel-integer pen widths. Then, resultant co-ordinate end points are revised to provide an approximately square end, based upon the found angle of inclination. A procedure is also described for assuring a best choice of a pixel to turn ON at an intersection of line segments.

15 Claims, 14 Drawing Sheets

PIXEL IMAGE EDGE ENHANCEMENT METHOD AND SYSTEM

FIELD OF THE INVENTION

This invention relates to raster scan graphics, and more particularly, to a system and method for providing improved edge representations of pixel graphics images.

BACKGROUND OF THE INVENTION

Printers which employ raster scan pixel displays are often called upon to represent filled polygonal shapes. The classical approach to contour "filling" of polygons is to process a set of polygon edge lists in scan-line order and from those lists, derive a set of interior horizontal line segments which are then printed as lines of black pixels.

With the onset of read/write frame stores and partial frame memories, processing time required for polygonal contour filling has been substantially improved. Newer algorithms typically plot a conventional vector outline into a single bit plane. Filling is then completed by processing the plane as though it were a large array. Thus, most of the execution time is spent interrogating portions of the bit plane to supply the algorithm with sufficient information to distinguish between a true edge, an already filled interior, and artifacts of the line drawing algorithm.

An efficient polygonal contour filling algorithm employs the concept of inverting pixels between edges of the polygon being processed. Such an algorithm is described in *The Edge Flag Algorithm—A Fill Method For Raster Scan Displays*, Ackland et al., IEEE Transactions On Computers, Vol. C-30, No. 1, Jan. 1981, pp. 41–47 and *Efficient Polygon-Filling Algorithms For Raster Displays*, Dunlavey, ACM Transactions On Graphics, Vol. 2, No. 4, Oct. 1983, pp. 264–273. Both Ackland et al. and Dunlavey describe a polygonal fill algorithm wherein pixels in the interior of a polygon are turned on by inverting an edge pixel and carrying the inversion action across the polygon until a bit map edge is experienced, at which point the inversion process is terminated. Neither Dunlavey or Ackland et al. focus upon edge representation problems that occur in the image as a result of the inversion-fill procedure. More precisely, they do not address how pixels at edge intersections are to be handled so as to avoid "splinters" from appearing across a page. If two polygon edges intersect at a common pixel location, the last pixel (or pixel step) of one edge will overlap a first pixel of the next edge. Thus, according to the prior art inversion procedure, pixels that extend in the scan direction from the common overlapping pixel are inverted and then re-inverted, as each of the succeeding pixels that comprise the overlapping pixel are processed. This action can create a "splinter" or a very narrow "non-filled" line that extends across the page.

In pixel raster-graphics systems it is often required that vectors be drawn having greater than minimum pixel widths. Some prior art printing devices with limited graphics capability draw such vectors by using fonts containing short segments. Such representations often appear to have "stepped" edges, the degree of stepping dependent upon the slant angle of the line. When grey scales are available, it is possible to achieve an "anti-aliasing" effect by placing grey pixels at the boundaries of such vectors so as to make them appear smoother. While anti-aliasing can improve the appearance of vectors, its techniques are applicable to only certain types of output devices.

If a vector of greater than minimum thickness is either vertically or horizontally oriented, there is no problem in representing it on a pixel grid of finite resolution. As soon as such a vector is rotated, however, the connection of points to define the vector outline poses a number of problems. Even when the end points of a vector lie exactly on the pixel grid, if the vector is oriented at an angle to the grid, portions of the vector will lie fractionally between two grid points.

A current method used to find the outline of a "fat" vector, entails applying half of the vector width to the vector's center line to find one vertex of a rectangle that represents the vector. Then, the full width of the vector is applied to the newly found vertex to find the other corner vertices of the rectangle. This action is accomplished by using sines and cosines to project the rotated vector onto an x,y co-ordinate system. A problem with this technique is that the pixel representations of the ends of the rectangle becomes distorted and often results in non-orthogonal ends for the vector.

Various methods have been proposed to handle representations of fat vectors on raster-graphics pixels displays. *"Digitized Brush Trajectories"*, Hobby, Report No. STAN-CS-85-1070, Department of Computer Science, Stanford University (1985) discloses a number of techniques for representing vector "pen-widths". Among such techniques, Hobby suggests (1) the use of polygonal pens having discrete shapes for constructing representations of vectors of various widths or (2) the building of envelopes with integer offsets to accomplish the same end.

A further description of the use of polygonal pens, as described by Hobby, can be found in *"Rendering Fat Lines On A Raster Grid"*, by Wallace, *Graphics Gems,* Glassner, Editor, Academic Press, Inc., San Diego, Calif. 92101 (1990), pp. 114–120. Wallace points out that if a line geometry is formulated using an Euclidean metric for line width (a perfectly circular pen instead of a polygon with integer "diameters"), not only does the calculation of x-directed spans require square roots, but the results are inferior to the integer based polygonal approach suggested by Hobby.

Another problem in raster-scan pixel images involves which pixels to "turn-on" at edge intersections. If the choice is not carefully made, such edge intersections exhibit "bumps" where errant pixels distort the intersection's representation.

It is therefore an object of this invention to provide an improved method for representing raster graphics images.

It is another object of this invention to provide an improved polygonal fill procedure for a raster- graphics pixel display wherein edge intersections are handled so as to prevent errant splinters.

It is yet another object of this invention to provide an improved raster-graphics imaging system for representing vectors of greater than minimum thickness.

It is still another object of this invention to provide an improved raster-graphics pixel display system wherein ON pixels resident at an intersection of two edges are chosen so as to best represent the intersection.

SUMMARY OF THE INVENTION

A data processing system that prints characters using a raster-scan pixel representation, employs an inversion technique to achieve the filling of interior pixels within a polygon. At intersections of segments that define edges of the polygon, a common pixel may be shared by the last pixel of a first line segment and a first pixel of a second line segment. The inversion action is inhibited when considering the last pixel of the aforesaid first segment and is turned on for the first pixel of the next segment. In this manner, double inversions that cause fill splinters are avoided. The data processing system also employs a method for rendering vectors with pen widths of varying magnitude where, based upon the angle of inclination of the vector, its end points are derived. The end points are then modified by addition of integer offset values to take into account differences between given pen widths and pixel-integer pen widths. Then, resultant co-ordinate end points are revised to provide an approximately square end, based upon the found angle of inclination. A procedure is also described for assuring a best choice of a pixel to turn ON at an intersection of line segments.

DESCRIPTION OF THE DRAWINGS

FIG. 4A shows the source outline for the W-Shaped polygon.

FIG. 4B shows scan one for the W-Shaped polygon.

FIG. 4C shows scan two for the W-Shaped polygon.

FIG. 4D shows scan three for the W-Shaped polygon.

FIG. 4E shows scan four for the W-Shaped polygon.

FIG. 4F shows scan five for the W-Shaped polygon.

FIG. 4G shows scan six for the W-Shaped polygon.

FIG. 4H shows scan seven for the W-Shaped polygon.

FIG. 4I shows scan eight for the W-Shaped polygon.

DETAILED DESCRIPTION OF THE INVENTION

The systems and methods disclosed herein provide image edge enhancement for pixel-represented images. While the invention will be disclosed in the context of a printer employing raster-arranged pixel images, it is to be understood that the invention is equally applicable to other systems that employ such image representations, i.e. facsimile machines, plotters, CRT raster displays etc.

Figure 1:
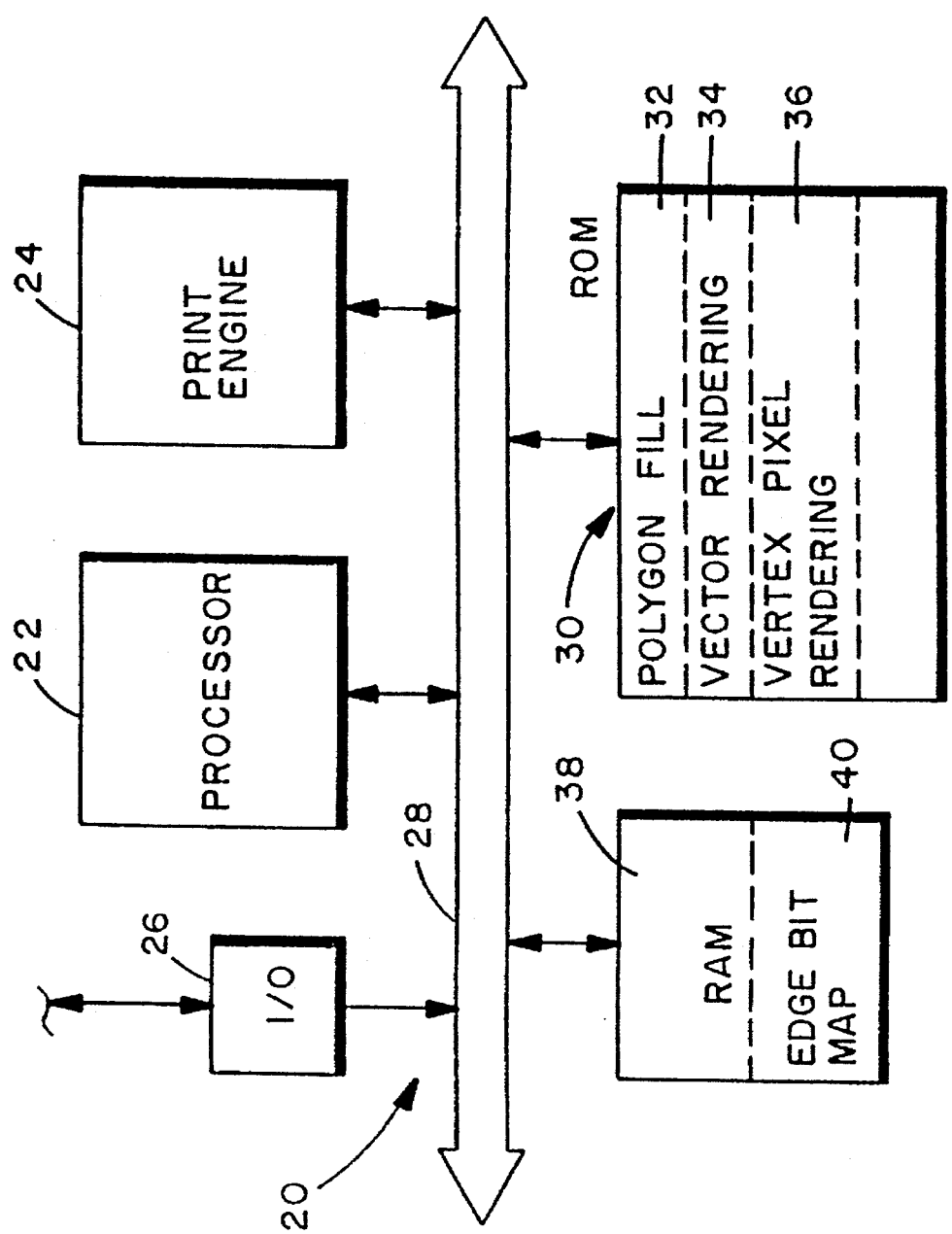
FIG. 1 is a block diagram of a data processing system for carrying out the invention hereof.

In FIG. 1, a high level block diagram of a printer 20 includes a processor 22, print engine 24, and an input/output module 26, all of which are interconnected by a bus 28. A read only memory (ROM) 30 is connected to bus 28 and provides stored software that implements the edge enhancement procedures to be described below. Those procedures include a polygon fill procedure 32, a vector rendering procedure 34 and a vertex rendering procedure 36. Polygon fill procedure 32 enables the interiors of polygons to be "filled" so that, when printed, the polygon will exhibit a uniform dot condition (e.g. all black). Vector rendering procedure 34 enables wide vectors to be constructed using a pixel representation, while also maintaining the vector ends approximately orthogonal to the vector's long dimension. Vertex pixel rendering procedure 36 provides a method for determining which pixel at an intersection of two edge segments should be turned ON to best represent the intersection.

A random access memory 38 contains an edge bit map 40 of a polygon being filled by polygon fill procedure 32. Edge bit map 40 is employed to correct edge-erosion that occurs during the polygon fill procedure and to assure that the polygon's edges are well-represented.

Figure 2:
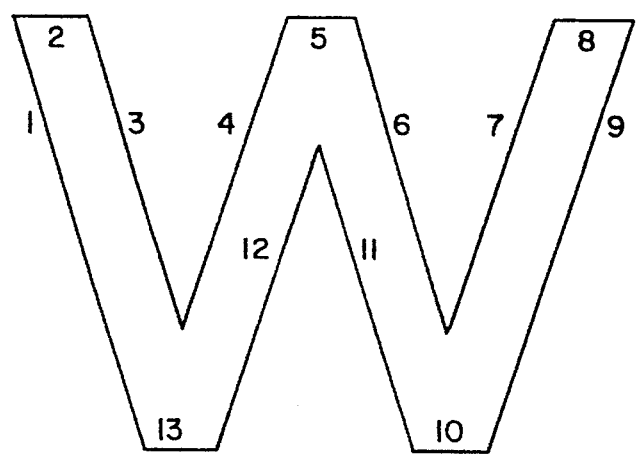
FIG. 2 is a representative W-shaped polygon that will be used to describe the operation of the invention.

In FIG. 2, a W-shaped polygon is shown which will be employed in the description of an aspect of the invention. The W-shaped polygon in FIG. 2 contains 13 total edges, of which 5 are horizontal, none are vertical and 8 are slanted. Each of those edges is stored in an edge table in the numbered sequence shown in FIG. 2. Each edge is handled by the invention in its numbered sequence.

Figure 3:
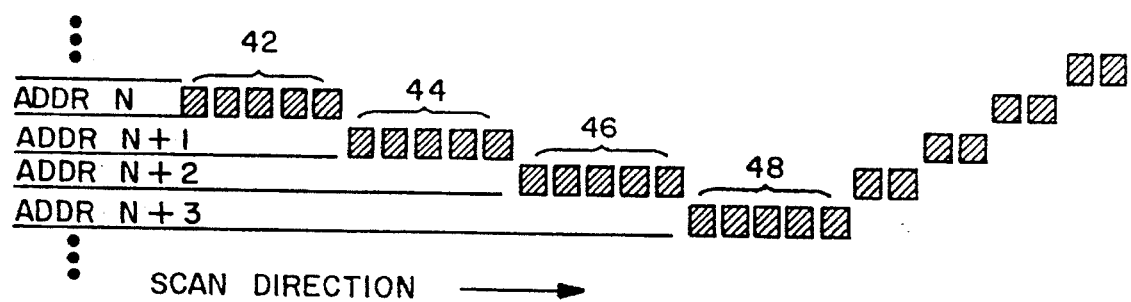
FIG. 3 indicates a pixel representation of an intersection of two edges, both/edges exhibiting acute angles of incidence.

As is known to those skilled in the art, an edge slanted at an angle approximately equidistant between vertical and horizontal axes, (e.g. edges 1, 3, 5, etc. in FIG. 2) may be represented by a series of offset single or double pixel steps in adjoining scan rows of a raster image. By contrast, when the slant angle of an edge is near vertical or horizontal axes, a plurality of pixels are required for each step in each scan row to properly illustrate the edge. Such a representation in shown in FIG. 3 wherein adjacent pixel groups 42, 44, 46 and 48 represent an edge having a small slant angle with respect to the horizontal. As will be understood, the pixel inversion polygon fill procedure causes the states of edge pixels 42, 44, 46 and 48 to be inverted, thereby significantly eroding the edges of a filled polygon. Such erosion is avoided, in the ultimate image produced herein, by maintaining an edge bit map which is, at the termination of the polygon fill procedure, overlayed onto the filled polygon to re-establish the eroded edges.

POLYGON FILL PROCEDURE

Figure 4:
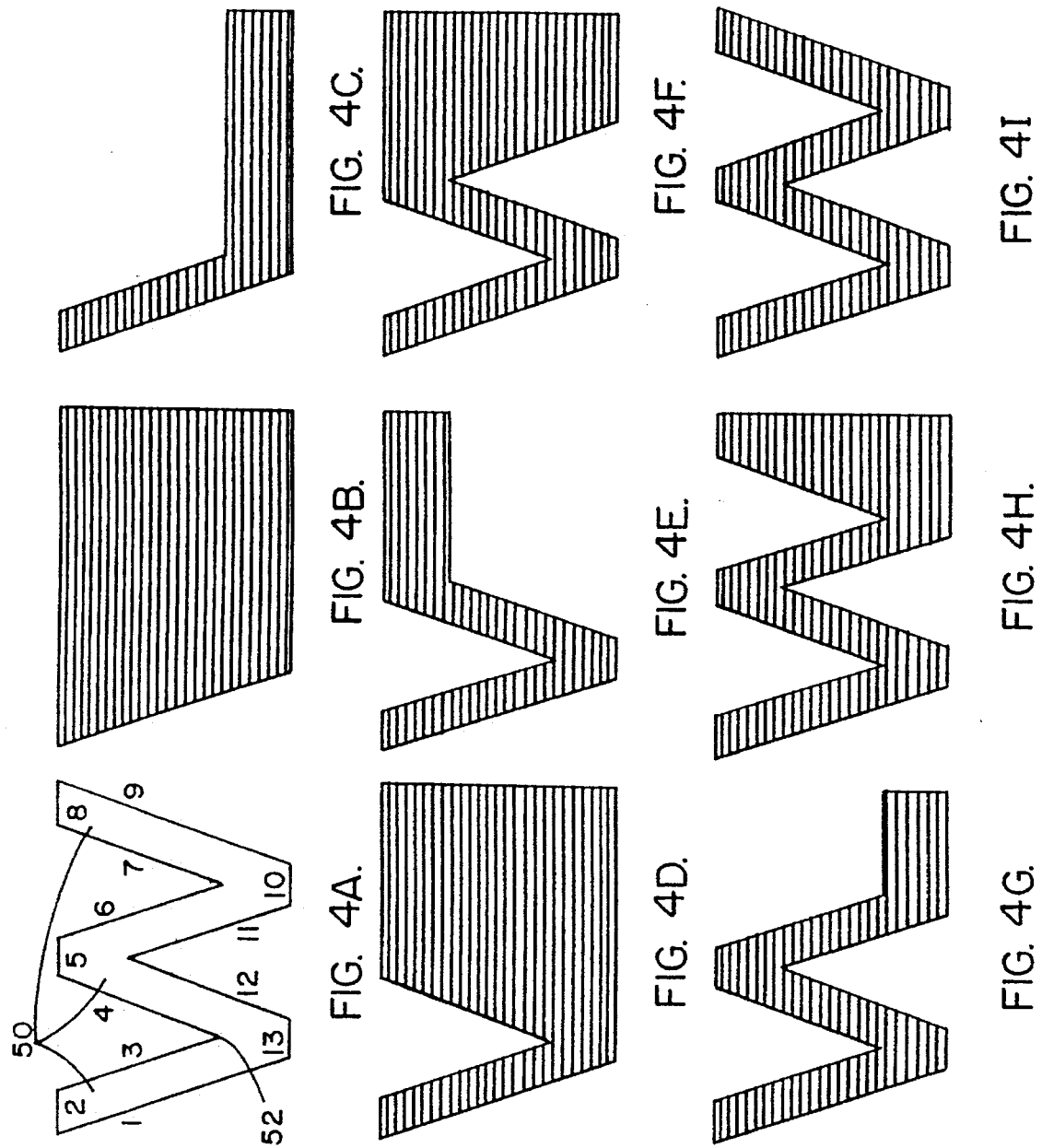
FIGS. 4A–4I shows succeeding scans employed to fill the interior of a W-shaped polygon.

Turning now to FIGS. 4–11, the polygon fill procedure will be described. As shown in FIGS. 4A–4I, the procedure begins with a source outline comprising a list of edges 1–13 of the W-shaped polygon, such edges being stored in sequence. Those edges enclose an area 50 that is to be filled with ON pixels so that the entire image is represented as polygon that has been filled with ON pixels. As shown in FIGS. 4–4I, the gross polygon fill procedure moves from left to right in the image, accessing sequential edges and handling them as follows.

Any non-horizontal edge has each of its pixels inverted, and all pixels to the right of each edge pixel are similarly inverted to the edge of the bit-map window. As each non-horizontal edge is handled in sequence, the procedure is repeated until the last edge, at which point the procedure is complete. Thus, edge 1 has all pixels to its right inverted to the black shading. Edge 2 is accessed and because it is horizontal the inversion procedure is inhibited and edge 3 is accessed. As shown in scan 2, all pixels to the right of edge 3 are inverted back to OFF state. Scans 3–8 continue as shown resulting in the entire W-shaped polygon image being filled with ON pixels.

The inversion procedure is both simple and fast; however, at intersections of edges where overlapping pixels occur, a "splinter" can occur in the case of a vertex pixel or step. Such a pixel is shown in the FIG. 4A at 52, and represents the intersection of edges 3 and 4. To prevent the occurrence of a splinter, the last pixel or step of edge 3 is not inverted. Then, the first pixel or step of edge 4 is turned on, but filling to the right edge of the bit map is inhibited.

Figure 5:
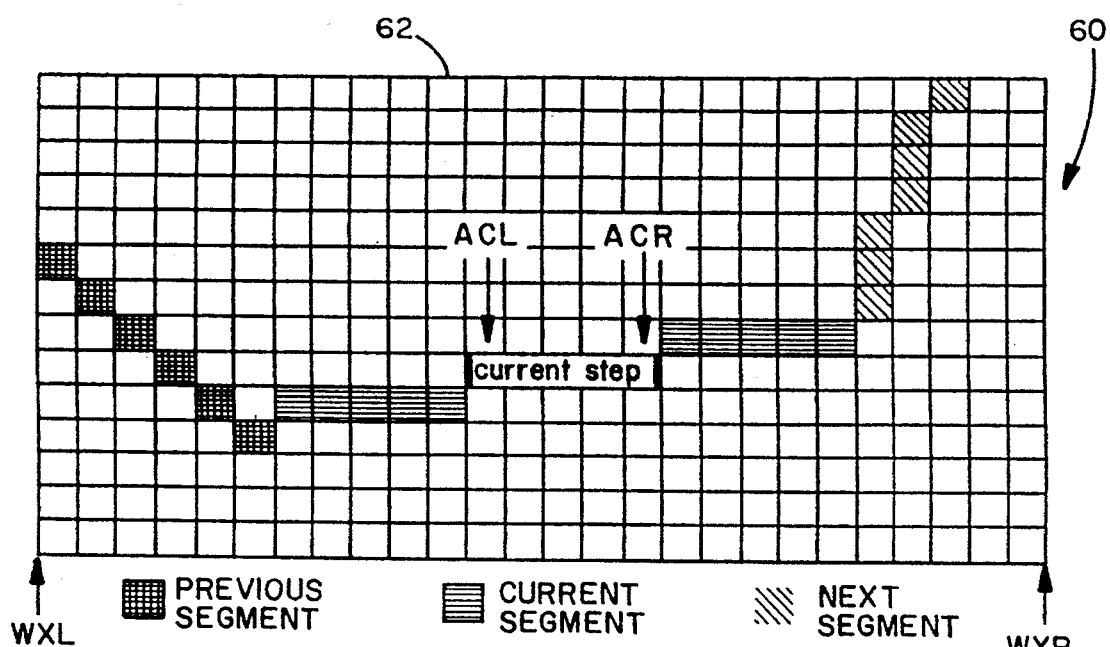
FIG. 5 are pixel representations to aid in establishing definitions of portions of an image.

Prior to describing the method that avoids creation of splinters, reference should be made to FIG. 5 wherein various portions of a pixel display are defined. An image window 60 includes a bit map grid 62. The left-most edge of bit map window 60 is termed WXL and its right-most edge is WXR. Each edge is comprised of a plurality of pixels, with edge segments that are nearly vertical or nearly horizontal exhibiting multiple pixel steps along each scan line. A "previous" edge segment is horizontally cross-hatched, a current edge segment under consideration is in black and a next edge segment to be considered is cross-hatched at an angle. A current pixel step under consideration has a left-most pixel ACL and a right-most pixel ACR.

Figure 6:
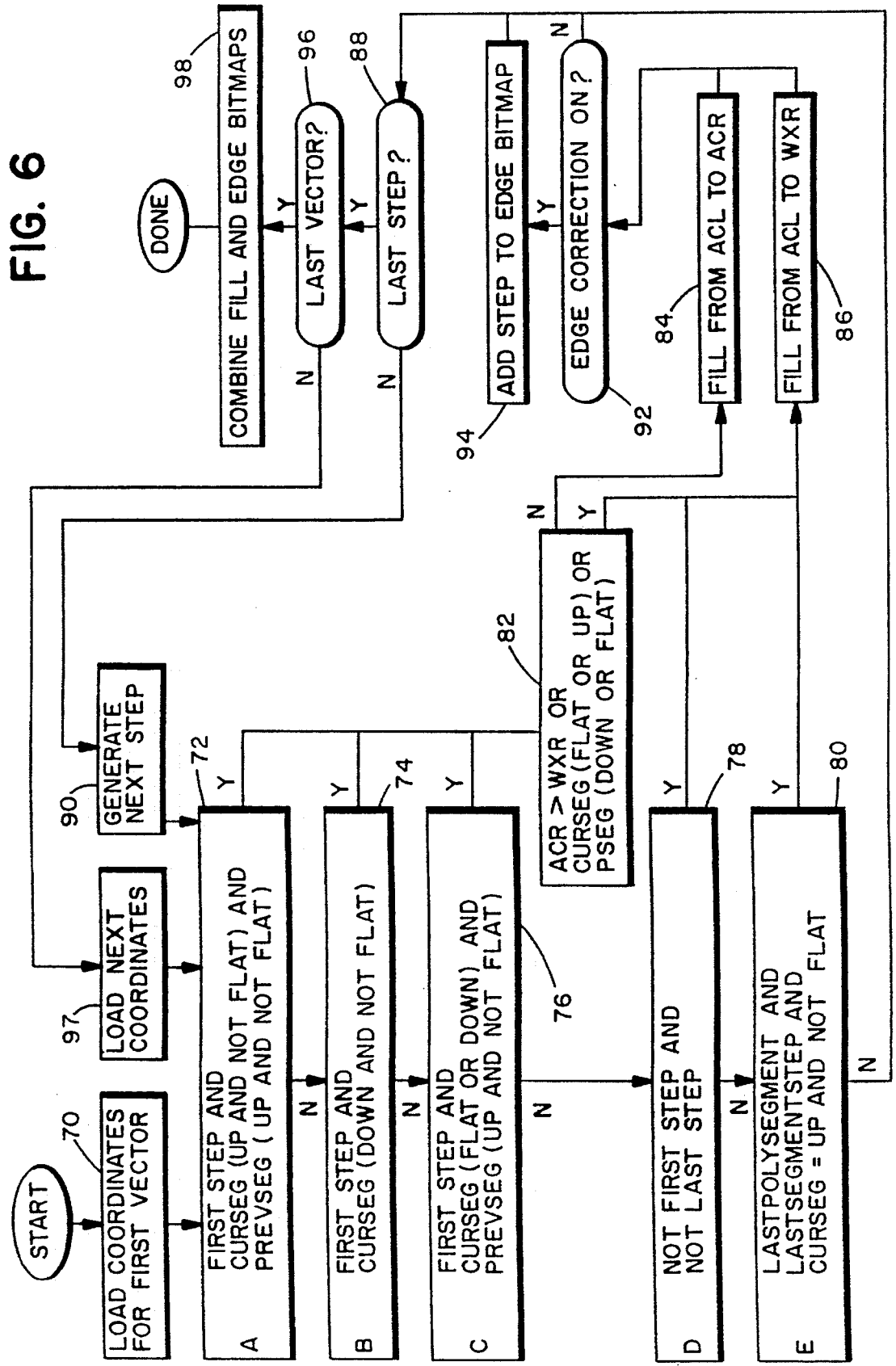
FIG. 6 is a flow diagram that illustrates a method of the invention.

Turning now to FIG. 6, a procedure will be described that enables avoidance of splinters during a polygon fill procedure. Initially, beginning and end coordinates of a first edge (vector) are loaded from an edge list (box 70). A number of determinations are then made concerning whether a pixel under consideration is the first step of an edge, the last step of the edge, between the first and last steps, and the orientation of current and previous edge segments. Based upon those determinations, a decision is made as to (1) whether the fill procedure (pixel inversion) should or should not be carried out to the right of the pixel under consideration; and (2) the extent to which the fill should occur, i.e., either just the pixel or pixel step currently being processed or all the way to the bit map edge in the scan direction.

Before describing the details of the procedure illustrated in FIG. 6, the various terms used therein will be defined:

CurSeg—The current segment being processed.

PreSeg—The segment processed just previous to the current one.

Down/Up—The direction indicated by a vector drawn from a segment start point to its endpoint (keeping in mind that start and end points are not limited to grid intersections.

Flat—A vector may be both up and flat or down and flat. Flat means that all of the pixels generated by the vector rendering algorithm for a given vector fall on the same scan line.

Step—The row of pixels generated by the line rendering algorithm for each crossing of a horizontal scan line by a vector. A flat vector has only one step, for instance.

ACR—This variable indicates the "rightmost" pixel location of a step.

ACL—This variable indicates the "leftmost" pixel position in a step.

WXR—This variable indicates the rightmost edge of the polygon filling window.

WXL—This variable indicates the leftmost edge of the polygon filling window.

For each of decision boxes 72, 74, 76, 78 and 80, an exemplary representation of the current and previous edge segments is given in FIGS. 7–11, respectively. Considering, decision box 72, if the pixel under consideration is the first step of an edge and both the current and previous edge segments have a slope in the up direction (with neither being flat), then it is known that a fill action will occur. As indicated by the definitions above, when an edge segment is defined as "up and not flat" or "down and not flat", it means that the edge segment has terminal sets of coordinates that indicate an up slope to the current segment, and that the slope is sufficiently large that the current segment is not represented by pixels on a single raster scan row. This can occur because coordinate points have a much higher level of resolution than pixel segments (i.e., called subpixel resolution, an important requirement for high quality rendering). Thus, an edge may actually have an up slope, but still be represented by a series of pixels along a single horizontal raster row.

A yes determination in decision box 72 is followed by an additional determination indicated in decision box 82. In essence, decision box 82 determines the extent of the fill action that is to be accomplished, (e.g. whether the fill action will be from ACL to ACR or WXR).

Figure 7:
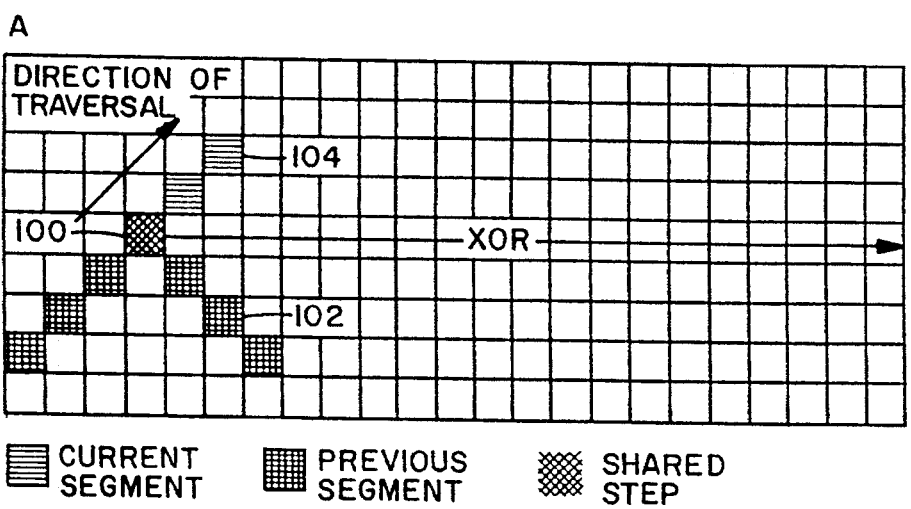
FIG. 7 illustrates an intersection of edges considered by box 72 in FIG. 6.

As shown in FIG. 7, the situation contemplated by decision box 72 is that shared step 100 is at the intersection of a previous edge segment (e.g. 102) whose slope is up and not flat and is the first step of a current edge segment 104 (whose slope is up and not flat). Under such circumstances, a fill action occurs using an inversion (Exclusive OR) function on pixel 100 and all pixels to the right of pixel 100.

Figure 8A:
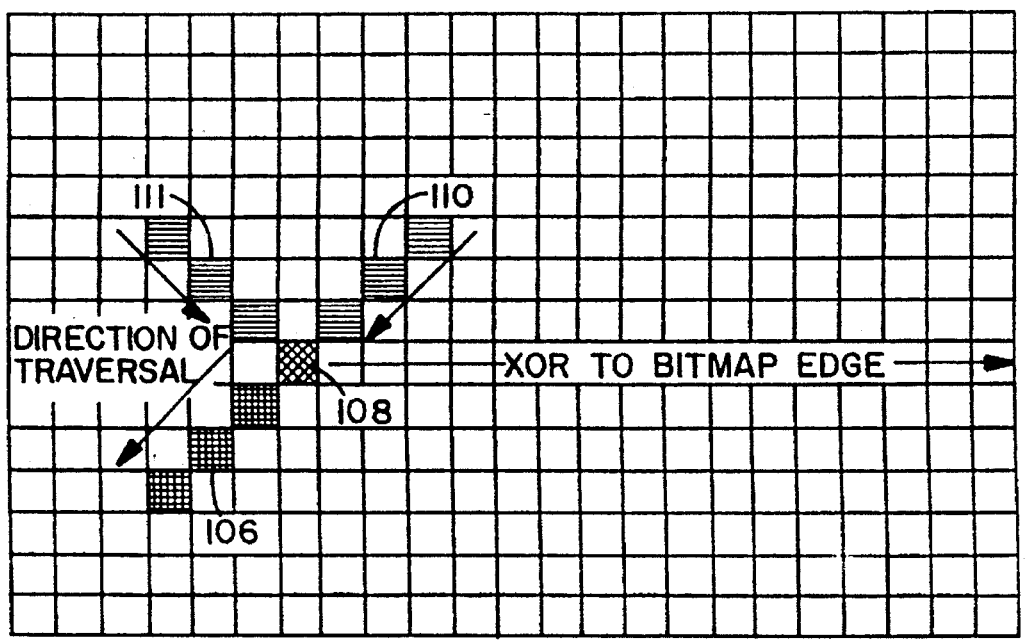
FIGS. 8a and 8b illustrate intersections of edges considered by box 74 in FIG. 6.
Figure 8B:
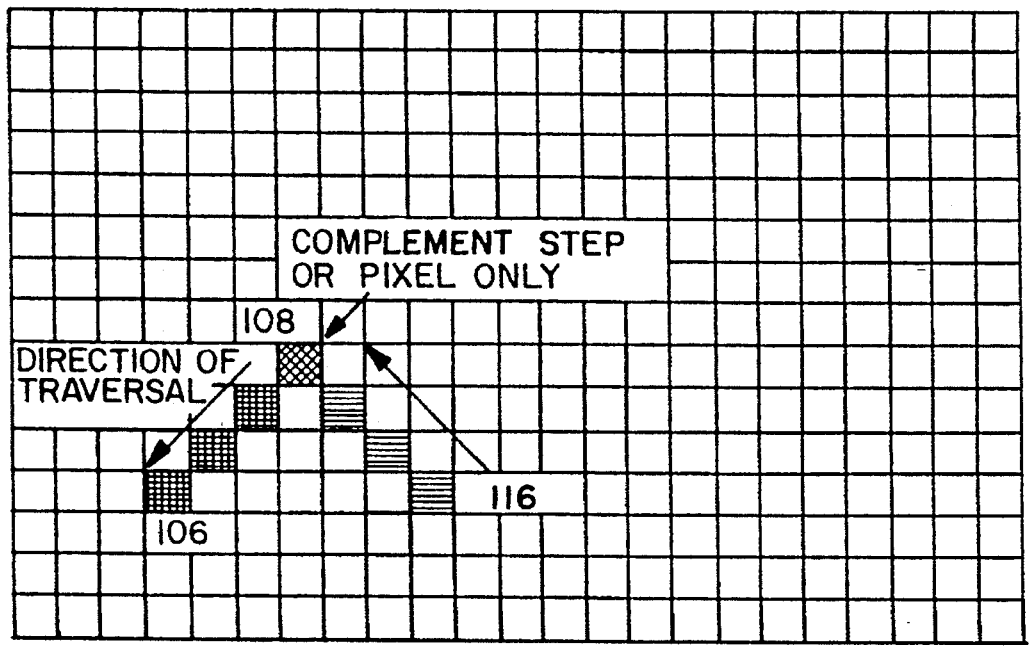

If the combined AND conditions in decision box 72 are not met, then a "no" indication causes the conditions in decision box 74 to be examined. If the pixel under consideration is first step and the current edge segment has a down slope and is not represented by a flat row of pixels, a fill action is required. The conditions shown in decision box 74 are illustrated in FIG. 8a, wherein current edge segment 106 shares first step pixel 108 with previous edge segments 110 or 111. Since pixel 108 is the first step of current edge segment 106 and edges 110 and 111 are directed downwardly, an inversion thereof occurs including all pixels to the right. In FIG. 8b, by contrast, a previous segment 116 is directed upwardly, causing decision box 82 to indicate a "No" result. Therefore only the pixel (or step) is inverted and no further inversion occurs to the bitmap edge.

Figure 9:
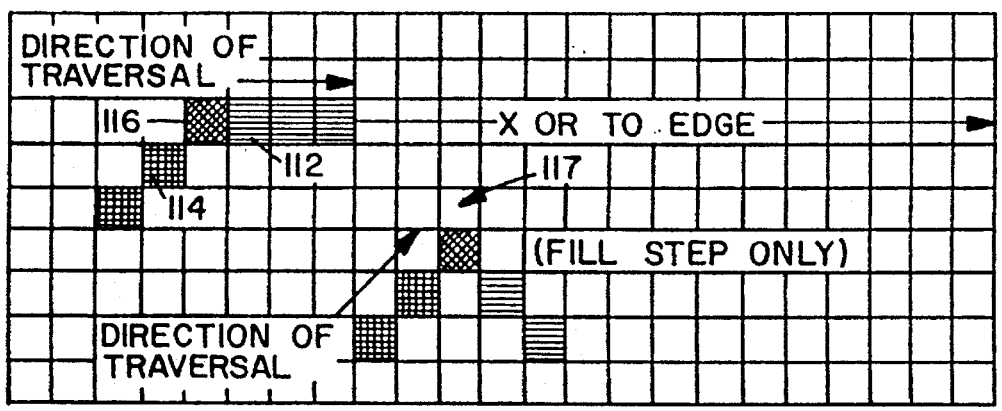
FIG. 9 illustrates an intersection of edges considered by box 76 in FIG. 6.

If the AND condition indicated in decision box 74 is not fulfilled, a "no" indication causes decision box 76 to be reached (see FIG. 9). In this instance, if the pixel is a first step and the current edge segment is either flat or down, and the previous edge segment is up and not flat, then a fill action to WXR is to occur. As shown in FIG. 9, current edge segment 112 and previous edge segment 114 share a common pixel 116. In this instance, current edge segment 112 is flat and previous edge segment 114 has an up slope. Under such conditions, a fill action is required. The arrangement of edges shown at 117 also fulfills the conditions of decision box 76 but with different results due to the condition indicated in decision box 82.

Figure 10:
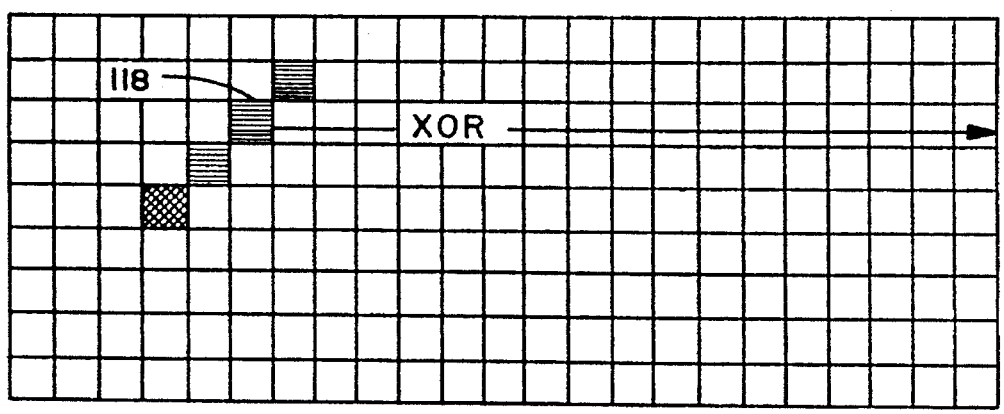
FIG. 10 illustrates the arrangement of a line segment as considered by box 78 in FIG. 6.
Figure 11:
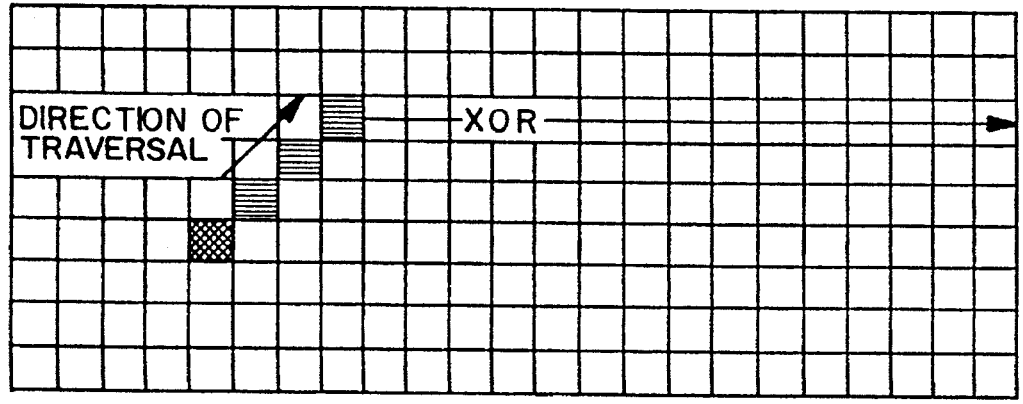
FIG. 11 illustrates an intersection of edges considered by box 80 in FIG. 6.

If the conditions in decision box 76 are not met, a no indication causes the procedure to move to decision box 78 which, in essence, determines if the pixel or step under consideration is neither the first nor the last step of an edge segment. As shown in FIG. 10, assuming that pixel or step 118 is the pixel under consideration, a fill action occurs from location 118 to WXR.

Finally, if none of the conditions shown in decision boxes 72–78 are fulfilled, the procedure moves to decision box 80 to determine whether the pixel/step is the last one in the last segment of a polygon being considered, and that the current segment is up and not flat. If all three of those conditions are met, a fill condition is indicated (see also FIG. 11).

As indicated above, YES indications from decision boxes 72, 74 or 76 indicate that a fill action is required. However, the extent of the fill action is determined by the conditions indicated in decision box 82. It is to be understood that a NO issues from decision box 82 only when all three of the conditions indicated therein are not fulfilled. A YES issues when any one condition is fulfilled. Thus, if ACR extends past the edge WXR of the bit map window, then a fill action occurs from ACL to WXR (box 86). Likewise, if the current edge segment is flat or up or the previous segment is down or flat the fill also occurs from the ACL to WXR. If all of the aforesaid conditions are not present, then the fill action occurs only to ACR. (causing just the step to be filled, as shown by box 84).

If YES indications issue from either of decision boxes 78 or 80, then a fill action occurs from ACL to WXR (box 86).

If none of the conditions shown in decision boxes 72, 74, 76, 78 or 80 are met, then the procedure immediately moves to determine whether a last pixel step has been encountered (decision box 88). If no, the procedure recycles by generating a next step (box 90) and continues as shown.

Once the fill actions indicated by boxes 84 and 86 are accomplished, as the case may be, it is determined whether edge correction is enabled (the decision box 92). If yes, the step is added to an edge bit map that is stored in RAM (box 94). If no, the procedure moves to determine whether a last pixel step has been encountered and if yes, whether the last vector of a polygon has been encountered (decision box 96). If yes, the filled polygon is OR'ed with the edge bit map to fill in the eroded edges that have resulted during the fill action (box 98). If no, the coordinates of the next edge are loaded (box 97) and the procedure repeats. Otherwise, the procedure is finished.

As can be seen from the above description, the fill action is controlled at the first pixel or step of an edge segment which is common with a last step of a previous edge segment. In this manner, a double inversion is prevented and splinters do not occur.

Rendering of "FAT" Vectors

In the process of rendering a vector that is "fat", there is little problem if such vector is either vertical or horizontal. However, if the vector is rotated, a representation of the vector edges becomes more complex.

Figure 12:
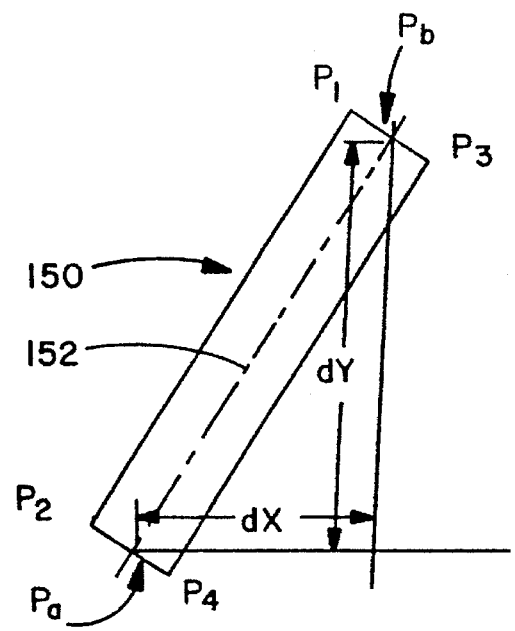
FIG. 12 illustrates a vector having a wide pen width.

Referring to FIGS. 12–16, a method is shown for handling the representation of such vector edges such that optimum presentation thereof are created. In FIG. 12, a "fat" vector 150 is represented as a rectangle whose angle is other than vertical or horizontal. Each coordinate point Pn is comprised of an XY pair $(x_n, y_n)$. Pa and Pb are end coordinate points of a center line 152 of vector 150. When a "pen width" is applied to center line 152, a rectangle is created as defined by coordinate points P1, P2, P3 and P4. As above described, the pen width sets the distance between points P1 and P3, and P2 and P4, respectively.

Figure 13:
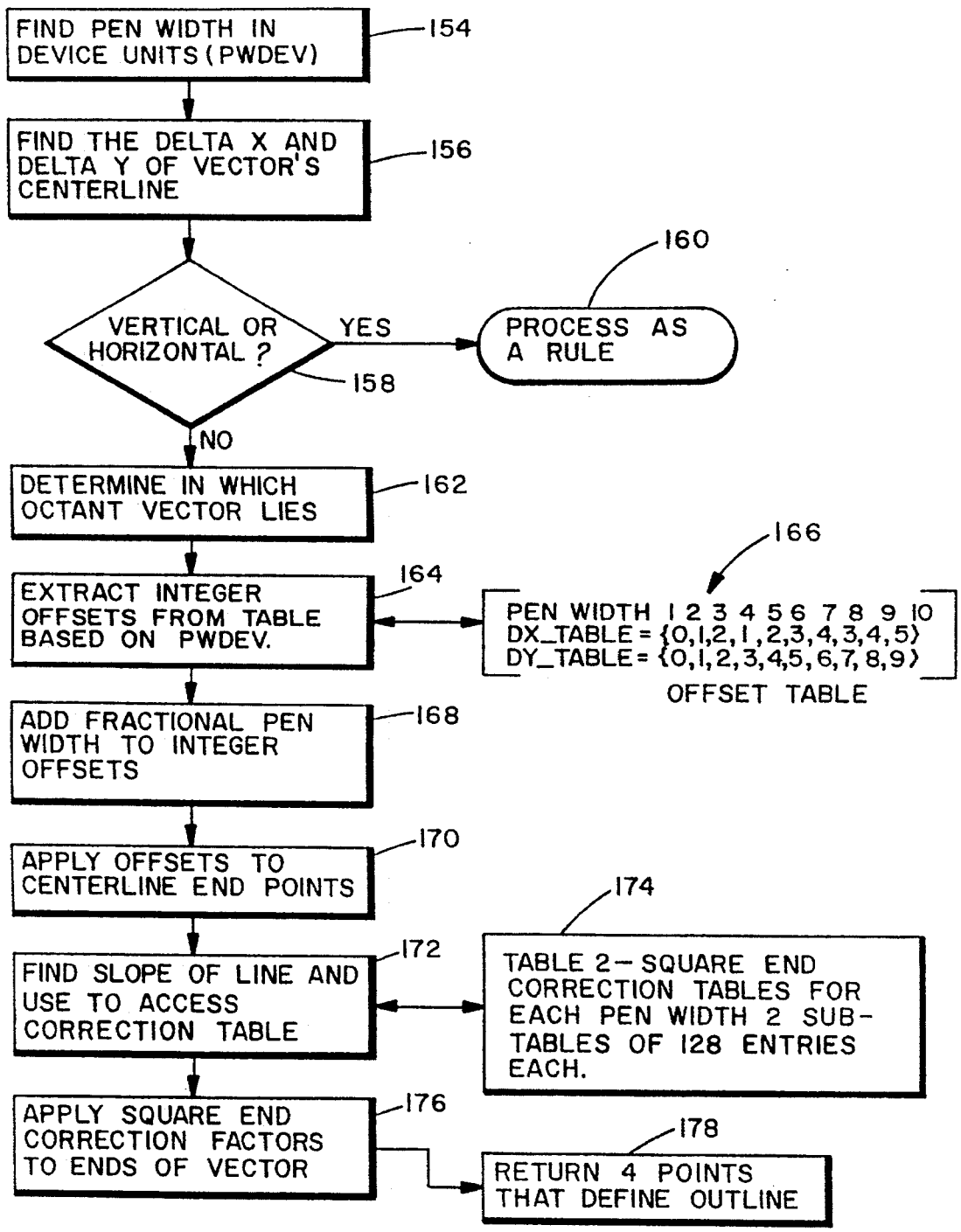
FIG. 13 illustrates a flow diagram for finding an optimum vector outline for the vector of FIG. 12.

Turning to FIG. 13, a flow diagram is shown which enables the finding of coordinate points of vector 150, without resorting to extended trigonometric arithmetic. Initially (see box 154), a required pen width is converted into "device units" or, in this instance, pixels (box 154). For the purposes of example, it will be assumed that the pen width converts to six pixels. If the required pen width does not convert exactly to pixels, a fractional error value is determined and stored, to be used for later correction.

Next, the dx and dy of center line 152 in FIG. 12 are found (box 156) by determining the x and y coordinate value differences between $P_a$ and $P_b$. Given dx and dy, it can be determined whether vector 150 is vertical or horizontal or is oriented at some other angle (decision box 158). If center line 152 is either vertical or horizontal, dy is zero (if horizontal) or dx is zero (if vertical). In either instance, the representation of vector 150 is processed as a rule, with appropriate pixels assigned so as to achieve, as closely as possible, the required pen width (box 160). If center line 152 is neither vertical nor horizontal, it is next determined in which octant the angle of center line 152 lies (box 162).

Figure 14:
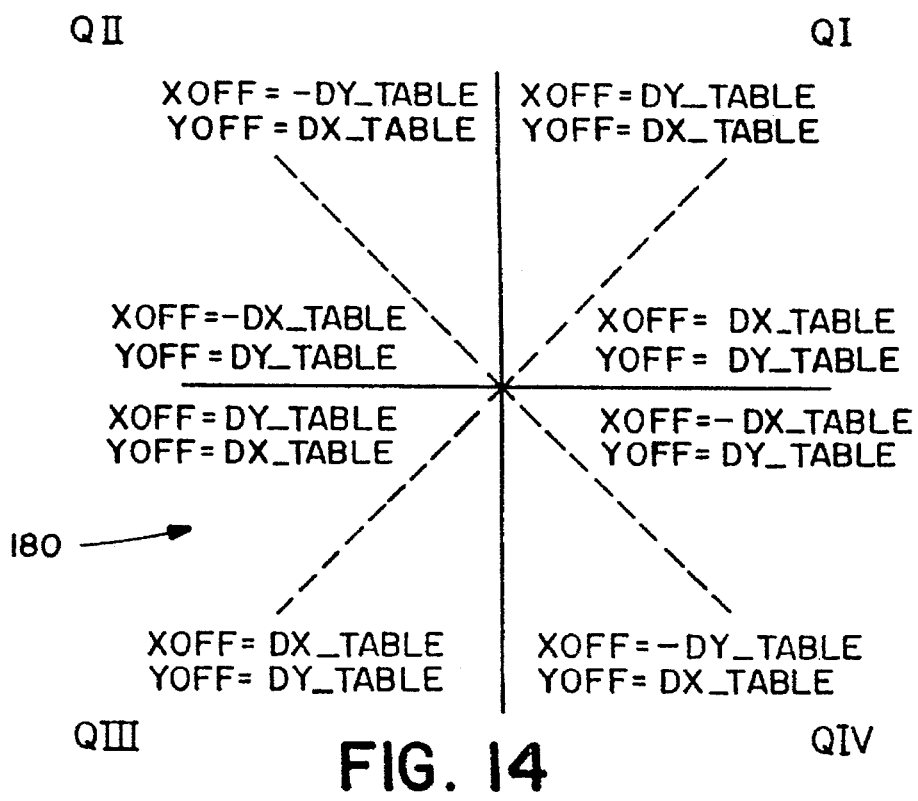
FIG. 14 illustrates an arrangement of octants used to classify a vector's angle.

Referring to FIG. 14, each of quadrants QI–QIV is subdivided into two octants. By a magnitude comparison of the values of dx and dy, it can readily be determined in which octant, center line 152 falls. If dx and dy are equal (45°), center line 152 is assigned to a next higher octant, whereas for any other values of dx and dy, center line 152 will fall in a given octant. This gross approximation of the angle of center line 152 enables simple corrections to be made to the pixel representations of coordinate points P1–P4, so as to improve the vector's rendering.

The procedure continues by extracting "integer offsets" from a table 166. Those offsets enable an initial positioning of the corner coordinates of vector 150. Table 166 contains a plurality of pen widths (e.g. 1–10) and associates those pen widths with x and y integer offset values given by a dx table and a dy table, respectively. Each integer offset is given in integer numbers of pixels. As will hereafter be understood, the x and y offsets, when applied to a point on vector center line 152, enable the location of a first corner coordinate of vector 150. The remaining coordinate offsets are then found using the first corner coordinate as a starting point.

Depending upon which octant the angle of center line 152 falls, the values in table 166 will either be assigned to an x offset value or a y offset value, employing the specific signs indicated in FIG. 14. Thus, if the angle of center line 152 falls within a first octant in QI, the values from the dx and dy tables are the x and y offset values, directly. If, by contrast, the angle of center line 152 falls within the octant 180 in QIII, the x offset value is given by the corresponding value in the dy table and the y offset value is given by a value in the dx table. The remaining equalities are shown in the various octants FIG. 14.

Referring back to FIG. 13 and box 164, x and y integer offsets are extracted from table 166 based upon the required pen width. Assuming a pen width of 6 and that the angle of center line 152 lies within the first octant in QI, the x and y offset values extracted from table 166 are three pixels and five pixels, respectively. Those values form two legs of a right triangle, with the hypotenuse being the integer-derived pen width. As the actual pen width may not exactly equal the derived integer pen width, the difference therebetween is employed to derive correction values that are added to the x and y integer offset values, respectively.

Figure 15:
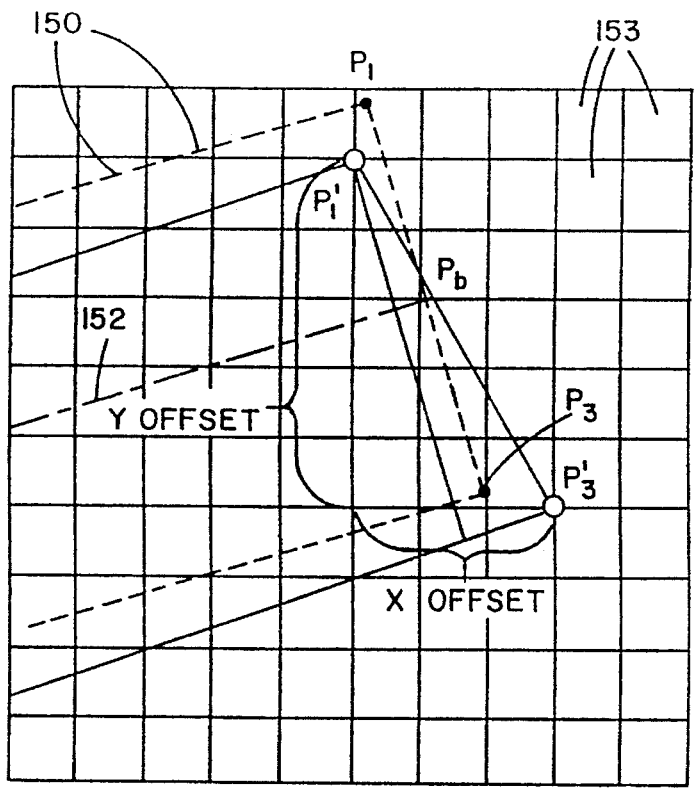
FIG. 15 is a pixel construct illustrating an intermediately determined vector end.

This will better be understood by referring to FIG. 15 wherein the x and y offsets are illustrated. In the case there illustrated, the x and y offsets are three pixels and five pixels, respectively, leading to an end line segment (i.e. hypotenuse) drawn between points P1' and P3'. If the given pen width is different from the hypotenuse distance, difference values are calculated and added to the x and y offsets to provide corrected values that more accurately locate points P1' and P3' (box 168, FIG. 13). (In the example drawn in FIG. 15, no correction difference values are illustrated.)

Once the corrected x and y integer offsets have been derived, each value is divided in half and is stepped off from the respective center line end point (e.g. $P_b$). In FIG. 15, end point Pb is shown and the location of P1' is found by stepping off the found half values of the corrected x and y offsets. Since only integer pixel values can be stepped off, x and y offsets of 1 and 2, respectively, are used to find point $P_1$'(rather than the actual values of 1.5 and 2.5). Once $P_1$' is found, the full corrected x and y offset values are added to the $P_1$' coordinates to place point $P_3$'.

Since the aforesaid pixel representation does not lend itself to fractional pixel widths, the described actions may result in a canting of the end line segment between points $P_1$' and $P_3$'. To correct that end line, a "square end" correction table 174 is employed (FIG. 13).

Entries for square end correction table 174 are created by using the dx and dy table and calculating how much each corner point needs to be altered to square-up the end line. Center line 152 of the vector is calculated and the x and y offsets are applied. Then, because the slope of the end line is the negative inverse of the slope of center line 152, a line with this new slope is drawn through the end point and the two points are calculated where it intercepts the two edges created by applying the integer x and y offsets to center point $P_b$. These new points are then compared against points $P_1$' and $P_3$' and the differences are used to create the table entries. First the difference in distance value from P1' to the calculated point is found and its value is placed in a Da table.

A similar calculation is carried out with respect to P3' and any difference value is placed in a Db table. Thus, once the slope of center line 152 is known, the Da and Db values can be accessed from table 174 and employed to reposition corner points P1' and P3'.

Figure 16:
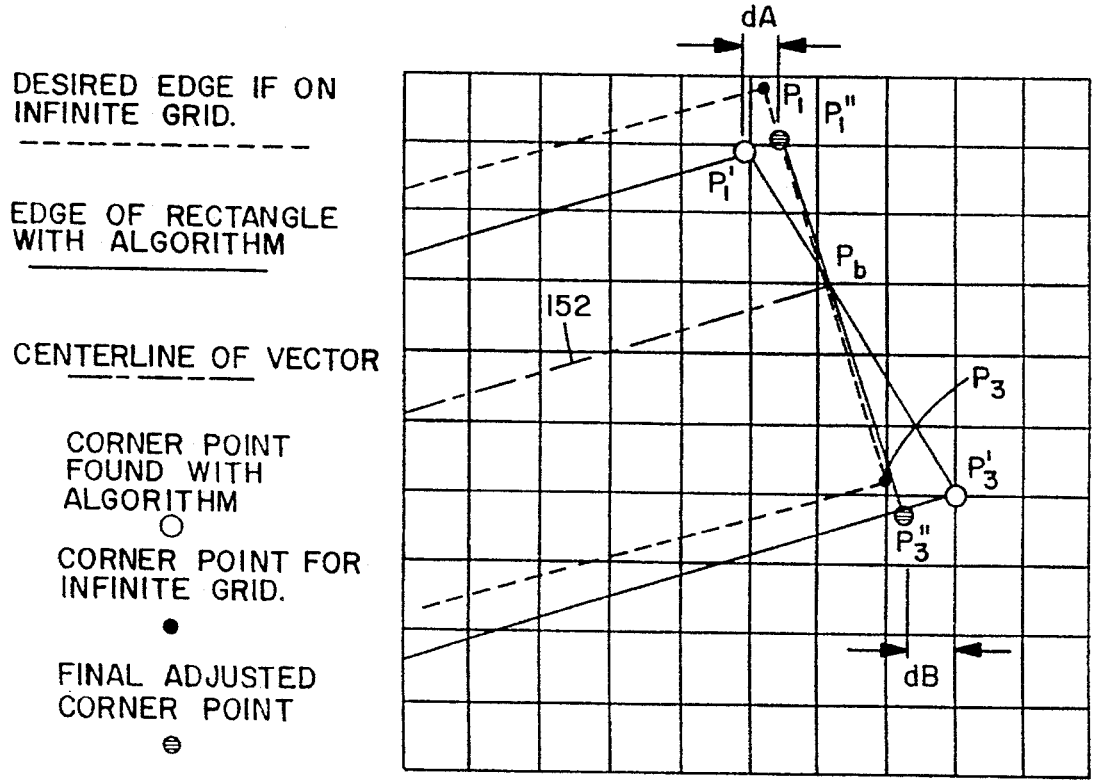
FIG. 16 is a pixel construct showing the effect of final correction factors applied to the construct of FIG. 14.

Referring to FIG. 16, it can be seen that point P1' becomes P1" by causing the x coordinate of P1' to be moved by an amount Da and the y coordinate by an amount Da multiplied by the slope, Similarly, point P3' becomes P3" by causing the x coordinate of P3' to be moved an amount Db in a negative direction and the y coordinate by an amount Db multiplied by the slope. In effect, these actions cause a clockwise rotation of the end line and thereby "square-off" the corner points of vector 150. This function is shown in FIG. 13 at boxes 172, 176 and 178.

VERTEX PIXEL REPRESENTATION

Once an end point of an edge segment of a polygon is found, a decision must be made as to how best to represent a vertex intersection of two edges. Unless the decision of which pixel to turn ON is carefully made, errant pixels may be turned ON that cause "bumps" in an otherwise smooth line representation. The procedure for determining which pixels to turn ON or OFF at a vertex is illustrated in FIGS. 17–27.

Figure 17:
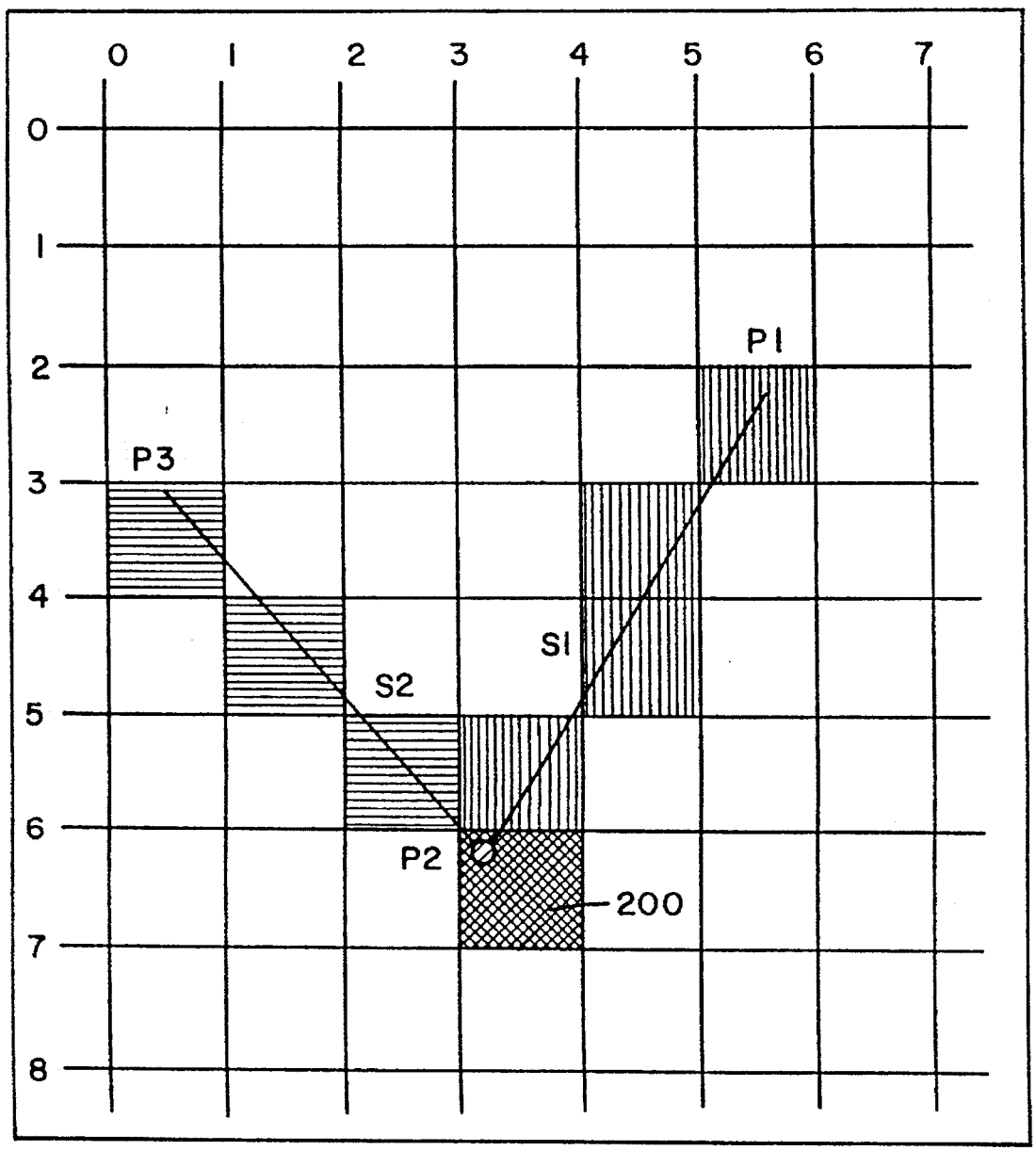
FIG. 17 illustrates two edge segments S1 and S2 and their intersection at a point P2.

Referring first to FIG. 17, a pair of edge segments S1 and S2 intersect at point P2. Edge segment S1 comprises coordinate points P1 and P2 and a line drawn therebetween. Edge segment S2 comprises coordinate points P3 and P2 and a line drawn therebetween. To provide an approximate pixel representation of edge segments S1 and S2, a line rendering algorithm is employed in the known manner. A question arises, however, with respect to pixel 200 as to whether it should be turned ON to represent vertex P2 or whether the vertex is better represented with pixel 200 in the OFF state.

A two part test is employed to determine whether pixel 200 should be turned ON or OFF. The first part of the test is a determination of whether vertex P2 lies in a pixel that is included in a representation of either of intersecting edge segments S1 or S2. The second part of the test is a determination of where the vertex is placed in a pixel under consideration. Based upon that determination, the second part test follows rules 1–3 below:

1. The vertex pixel is turned ON if it is included as a pixel of a rendered approximation of both intersecting edge segments S1 and S2 (as determined by test one).
2. A vertex pixel is turned ON if it is included as a pixel comprising a rendered approximation of edge segment S1 only, and edge segment S1 covers half or more of the area of the vertex pixel. The latter determination is made by drawing orthogonal major and minor axes through the vertex point, with a major axis representing a projection on either the x or y axes of the longest component of the edge segment that appears in the pixel. This construct will become more apparent in the specific examples given below.
3. The vertex pixel is turned on if it is included as one of the pixels of a rendered approximation of edge segment S2 only, and S2 covers half or more of the vertex pixel with its major axis.

Figure 18:
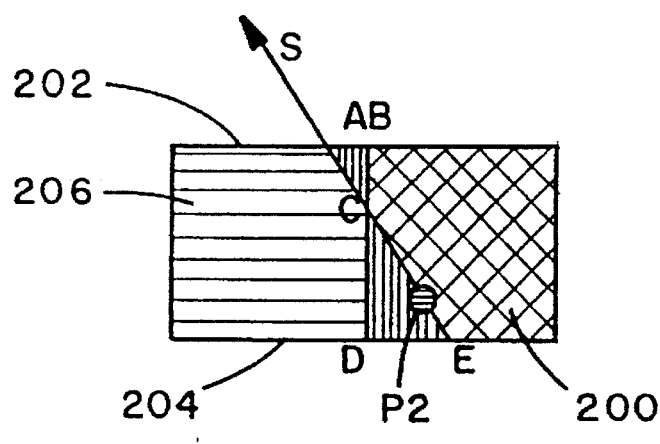
FIG. 18 shows adjoining pixels wherein an edge segment crosses a vertical boundary between the pixels and the edge segment is mostly in a right-most pixel.
Figure 19:
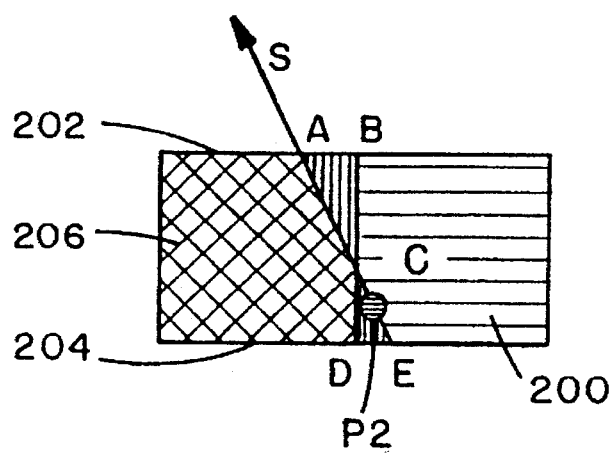
FIG. 19 shows adjoining pixels wherein an edge segment a vertical boundary between the pixels and the segment is mostly in a left-most pixel.
Figure 20:
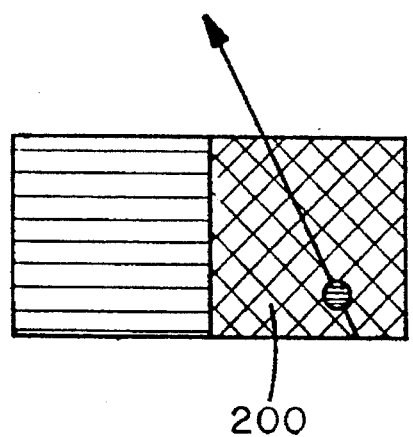
FIG. 20 shows adjoining pixels wherein an edge segment is entirely within one pixel.

As indicated above, the first test is whether a pixel includes the vertex point of one or the other of the edge segments S1 or S2. The term "includes", as used herein, means that a comparison of areas bounded by a portion of an edge segment in a pixel under consideration is greater than a bounded area in an adjacent pixel. FIGS. 18–20 consider the situation where an edge segment is mostly vertical, i.e. its y component is larger than or equal to its x component. To carry out the test, the edge segment S is extended to nearest horizontal boundaries of the pixels being considered.

In FIG. 18, boundaries 202 and 204 are the horizontal boundaries and point P2 is resident in pixel 200. Adjacent pixel 206 is also intercepted by edge segment S. Edge segment S (and its extension) result in a triangle ABC in pixel 206 and a triangle CDE in vertex pixel 200. The area of triangle ABC is compared to the area of triangle CDE. If the area of triangle ABC is smaller than the area of triangle CDE, vertex pixel 200 is turned ON.

FIG. 19 shows a situation where point P2 is located closer to the vertical boundary between pixels 200 and 206. In this case, triangle ABC is larger in area than triangle CDE, so pixel 204 is turned on. If, however, edge segment S crosses no vertical boundary before crossing both horizontal boundaries of a pixel (i.e., pixel 200 in FIG. 20) then pixel 200 is turned ON. If none of the above cases is true, vertex pixel 200 is not turned ON.

Figure 21:
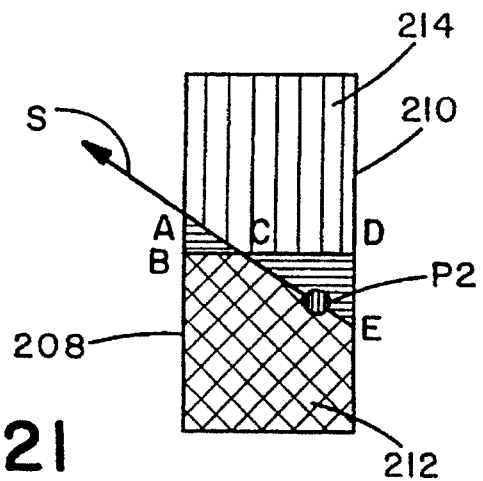
FIG. 21 shows adjoining pixels wherein an edge segment crosses a horizontal boundary between pixels and the segment is mostly in the lower-most pixel.
Figure 22:
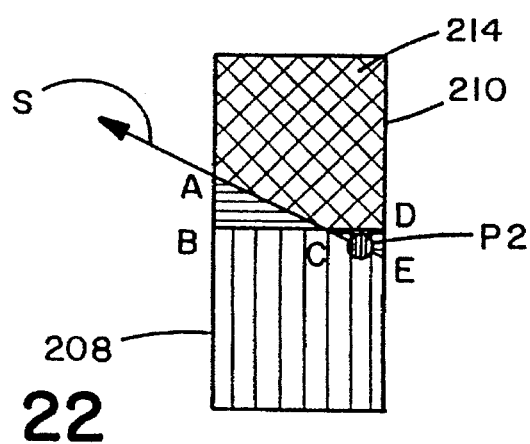
FIG. 22 shows adjoining pixels wherein an edge segment crosses a horizontal boundary between pixels and the line segment is mostly in the upper-most pixel.
Figure 23:
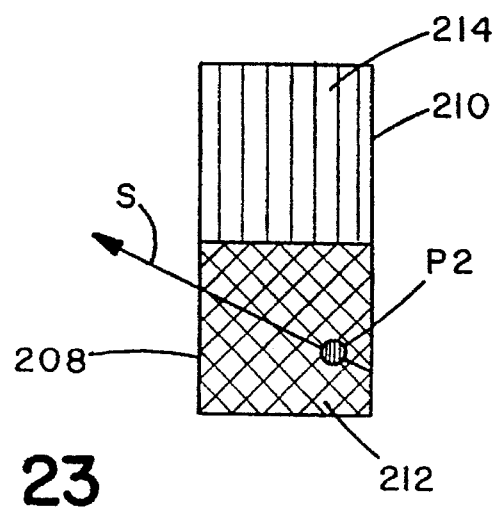
FIG. 23 shows adjoining pixels wherein an edge segment is entirely within a lower-most pixel and crosses no common boundary between the pixels.

Turning to FIGS. 21–23, a mostly horizontal edge segment S (i.e., its x component is larger than or equal to its y component) is extended to the nearest vertical pixel boundaries 208 and 210. The resulting triangles ABC and CDE are compared for enclosed areas and if triangle ABC is smaller in area than triangle CDE, vertex pixel 212 is turned ON. By contrast, (as shown in FIG. 22), if triangle ABC is larger in area than triangle CDE, pixel 214 is turned ON, notwithstanding the fact that vertex point P2 is in vertex pixel 208. Finally, if segment S crosses no horizontal boundary before crossing vertical boundaries 208 and 210, pixel 212 is turned ON. If none of the above cases is true, then the vertex pixel is not turned ON.

Figure 24:
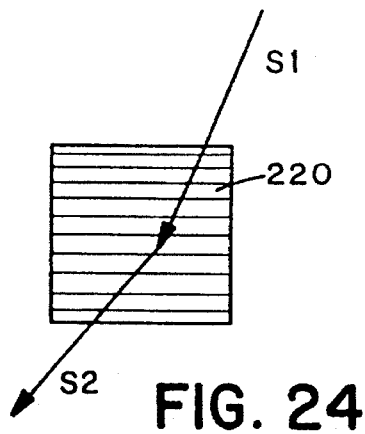
FIGS. 24–27 show a variety of edge segment/vertex point intersections and illustrates constructs employed to determine whether the pixel, in which the intersection point occurs, is or is not to be printed.
Figure 25:
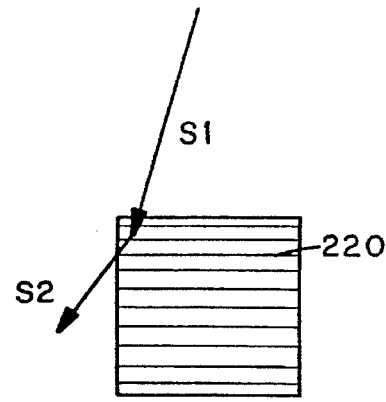

Once end pixels for both line segments S1 and S2 have been determined, it is necessary to determine which vertex pixel should finally be printed. As indicated above, rule number 1 indicates that a pixel is printed if it is included as one of the pixels comprising a rendering approximation of both edge segments S1 and S2. An example of such an arrangement is shown in FIG. 24 wherein vertex pixel 220 is printed. FIG. 25 shows the case where vertex pixel 220 would not be printed (for the reasons given during the description of FIGS. 18–23).

Figure 26:
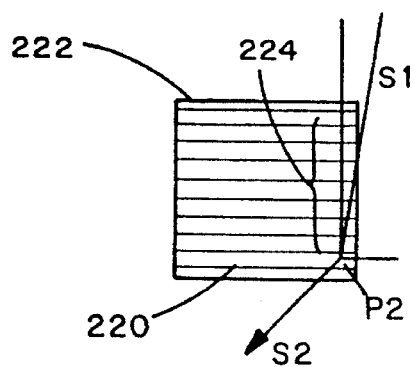
Figure 27:
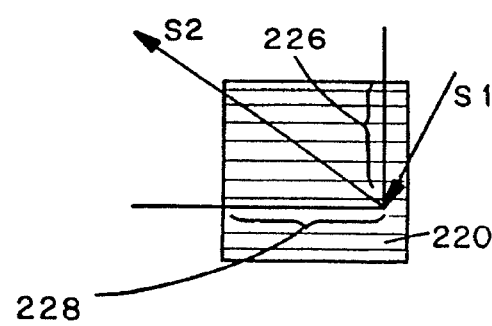

A pixel, however, is printed if it is included as one of the pixels comprising a rendered approximation of one edge segment only and that edge segment includes more than half of the vertex pixel. This case is shown in FIGS. 26 and 27. In FIG. 26, considering edge segment S1, a major axis is drawn parallel to the longest projected component of the edge segment. Thus, major axis 224 in pixel 220 is the axis that is parallel to the Y dimension, and the minor axis of S 1 is drawn parallel to the X dimension. Since major axis 224 (i.e., distance between vertex point P2 and horizontal boundary 222) covers more than half of pixel 220, pixel 220 is printed as representative of P2.

In FIG. 27, edge segment S2 is considered and its minor axis 226 is oriented along the Y dimension, and its major axis 228 is oriented along the X dimension. In this case, the major axis of edge segment S2 covers one-half of pixel 220, thereby calling for pixel 220 to be printed.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. In a data processing system for printing raster scan images, a method for causing pixels within a polygon to exhibit a common value, said polygon comprising a plurality of line segments, each line segment represented by a plurality of pixels exhibiting said common value, said polygon at least partially positioned within a raster scan window having X and Y dimensions and a plurality of X dimension rows, said method comprising:

(a) selecting, from one X extent to a second X extent of said raster scan window, at least a sequence of said line segments;

(b) from a first pixel of each said selected line segment, inverting all pixel values to said second X extent that lie along a common X dimension row with said first pixel;

(c) repeating the inversion action of step (b) for each of a plurality of pixel rows comprising a said selected line segment, between a first pixel row and a last pixel row of a said line segment; and (d) at an intersection of selected first and second line segments where a common pixel is shared by a last pixel of one line segment and a first pixel of a next line segment, inhibiting the inversion action of step (b) as applied to said last pixel of said one line segment and other pixels lying along a common X dimension row.

2. The method recited in claim 1 wherein each line segment has beginning and end coordinate x, y pairs, a line segment having an end y coordinate pair value that is greater than a beginning y coordinate pair value being an up line segment, the method comprising the further step of:

(e) for any line segment whose beginning and end pixels lie on a common X dimension row, inhibiting said inversion action of step (b) for pixels lying on a row common with said first pixel, including said first pixel, when an immediately previous line segment is not up or is up but is represented by pixels in a single row.

3. The method as recited in claim 2, further comprising the step of:

(f) creating a bit map representing pixels of said common value that define line segments comprising said polygon; and (g) OR'ing said bit map with all pixels of said polygon exhibiting said common value after all pixels interior to said polygon have been subjected to said inversion actions.

4. The method as recited in claim 3, wherein said inverting action of step (b) comprises exclusive OR'ing a value with each pixel value lying along a common raster scan row.

5. A method for printing a raster scan image of a vector with a given pen width, said vector having opposed end segments disposed about a center line, each end segment defined by first and second coordinate pairs, said printing method being by means of pixels in a raster scan representation, said pixels exhibiting a lower level of resolution than said coordinate pairs, said method comprising the steps of:

(a) finding an approximate angle of inclination of said vector;

(b) dependent upon said found approximate angle of inclination, determining X and Y pixel integer offset values indicative of X and Y displacements between the coordinate pairs of a said end segment;

(c) employing said X and Y pixel integer offset values to locate first and second coordinate pairs defining said end segment within said pixel representation; and (d) revising a value of at least one said coordinate pair in accordance with said found approximate angle of inclination to provide a substantially square end to said vector.

6. The method as recited in claim 5 further comprising the step of:

(e) accounting for a difference between said given pen width and a pen width derived from said X and Y offset values as found in step (b), by modifying said determined X and Y integer offset values in accordance with said difference.

7. The method as recited in claim 5, wherein said revising step (d) alters the values of both coordinate pairs of said end segment to provide said substantially square end for said line segment.

8. A method for printing a first line segment by a pixel representation and determining a pixel to represent an end point of said line segment, said end point residing in a first pixel, said line segment and an extension thereof intersecting representations of adjoining horizontal and vertical boundaries of said first pixel and a representation of a horizontal boundary of a second pixel, said second pixel sharing a said vertical boundary with said first pixel, said line segment and extension forming first and second triangles with said respective boundaries in said first and second pixels, said method comprising the steps of:

(a) comparing said first and second triangles to determine which said triangle has a greater included area; and (b) assigning to represent said end point, the pixel which contains the triangle having the greater area.

9. The method as recited in claim 8 wherein if said line segment and extension do not intersect a representation of a vertical boundary of said first pixel, said first pixel is assigned to represent said end point.

10. A method for printing a line segment by a pixel representation and determining a pixel to represent an end point of said line segment, said end point residing in a first pixel, said line segment and an extension thereof intersecting representations of adjoining vertical and horizontal boundaries of said first pixel and a representation of a vertical boundary of a second pixel, said second pixel sharing a said horizontal boundary with said first pixel, said line segment and extension forming first and second triangles with said respective boundaries in said first and second pixels, said method comprising the steps of:

(a) comparing said first and second triangles to determine which said triangle has a greater included area; and (b) assigning to represent said end point, the pixel which contains the triangle having the greater area.

11. The method as recited in claim 10, wherein if said line segment and extension do not intersect a representation of a horizontal boundary of said first pixel, said first pixel is assigned to represent said end point.

12. The method as defined in claim 10 wherein a second line segment shares said end point of said first line segment and said end point is located in said first pixel, said method comprising the additional steps of:

(c) printing said first pixel if said first pixel is assigned to represent said end point for both said first and second line segments; and (d) if said first pixel is assigned to represent an end point of only one said line segment, printing said first pixel only if a projection of a portion of said line segment along first and second dimensions is at least equal to a substantial portion of a dimension of said first pixel.

13. The method as defined in claim 12 wherein said substantial portion of said dimension is equal to at least one half of said dimension.

14. The method as defined in claim 10 wherein a second line segment shares said end point of said first line segment and said end point is located in said first pixel, said method comprising the additional steps of:

(c) printing said first pixel if said first pixel is assigned to represent said end point for both said first and second line segments; and (d) if said first pixel is assigned to represent an end point of only one said line segment, printing said first pixel only if a projection of a portion of said line segment along first and second dimensions is at least equal to a substantial portion of a dimension of said first pixel.

15. The method as defined in claim 14 wherein said substantial portion of said dimension is equal to at least one half of said dimension.

* * * * *